United States Patent
Muijs et al.

(10) Patent No.: US 8,379,971 B2
(45) Date of Patent: Feb. 19, 2013

(54) IMAGE GAMUT MAPPING

(75) Inventors: Remco Theodorus Johannes Muijs, Eindhoven (NL); Erno Hermanus Antonius Langendijk, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 1019 days.

(21) Appl. No.: 12/377,612

(22) PCT Filed: Aug. 13, 2007

(86) PCT No.: PCT/IB2007/053209
§ 371 (c)(1),
(2), (4) Date: Feb. 16, 2009

(87) PCT Pub. No.: WO2008/020393
PCT Pub. Date: Feb. 21, 2008

(65) Prior Publication Data
US 2010/0165139 A1   Jul. 1, 2010

(30) Foreign Application Priority Data
Aug. 16, 2006   (EP) ..................... 06119001

(51) Int. Cl.
*G06K 9/00* (2006.01)
(52) U.S. Cl. ......................................... 382/162
(58) Field of Classification Search .......... 382/162–167, 382/254, 260, 264
See application file for complete search history.

(56) References Cited

U.S. PATENT DOCUMENTS
5,416,890 A * 5/1995 Beretta .......................... 345/590
(Continued)

FOREIGN PATENT DOCUMENTS
EP   1098511 A2   5/2001
EP   1335584 A2   8/2003
(Continued)

OTHER PUBLICATIONS

Yang C C et al: "Gamut Clipping in Color Image Processing" Proceedings 2000 International Conference on Image Processing. ICIP 2000. Vancouver, Canada, Sep. 10-13, 2000, International Conference on Image Processing, New York, NY : IEEE, US, vol. 2 of 3. Conf. 7, Sep. 10, 2000, pp. 824-827, XP001129134 ISBN: 0-7803-6298-5.

(Continued)

*Primary Examiner* — Alex Liew
(74) *Attorney, Agent, or Firm* — Shimokaji & Assoc., PC

(57) ABSTRACT

A method of gamut mapping maps an input image composed of pixels and having an input gamut (IG) defined by input RGB primaries (Ri, Gi, Bi) to a reproduction gamut (RG) defined by reproduction RGB primaries (Ro, Go, Bo). The reproduction gamut (RG) is narrower than the input gamut (IG). An input signal (RGBin) defined with respect to the input RGB primaries (Ri, Gi, Bi) is color transformed (1) into a transformed signal (RGBt) defined with respect to the reproduction RGB primaries (Ro, Go, Bo), whereby color information of the pixels (P1, P2, P3) within the reproduction gamut (RG) is preserved. Scaling factors (SFi) indicating a distance between on the one hand pixels (P1, P2, P3) of the transformed signal (RGBt) which are outside the reproduction gamut (RG), and on the other hand an edge of the reproduction gamut (RG) are determined (2). The scaling factors (SFi) of pixels (P1, P2, P3) of the transformed signal (RGBt) are spatial low-pass filtered (3) to obtain filtered factors (FFi) for these pixels (P1, P2, P3). Component signal values of the transformed signal (RGBt) of the pixels (P1, P2, P3) are corrected (4) in response to the filtered factors (FFi) to obtain reproduction signal values (RGBo) which are input values (RGBi) moved towards inside the reproduction gamut (RG).

14 Claims, 3 Drawing Sheets

U.S. PATENT DOCUMENTS

| | | | |
|---|---|---|---|
| 5,450,216 A | | 9/1995 | Kasson |
| 5,467,412 A | * | 11/1995 | Capitant et al. ............... 382/167 |
| 5,689,590 A | * | 11/1997 | Shirasawa et al. ............ 382/254 |
| 5,956,432 A | * | 9/1999 | Ohta ............................. 382/264 |
| 2005/0225562 A1 | * | 10/2005 | Higgins et al. ................ 345/604 |

FOREIGN PATENT DOCUMENTS

| | | |
|---|---|---|
| WO | 9700495 A1 | 1/1997 |
| WO | 2005109854 A1 | 11/2005 |

OTHER PUBLICATIONS

Spaulding K E et al: "Optimized Extended Gamut Color Encoding for Scene-Referred and Output-Referred Image States" Journal of Imaging Science and Technology, Society of Imaging Science & Technology, Springfield, VA, US vol. 45, No. 5, Sep. 2001, pp. 418-426, XP001194779 ISSN: 1062-3701.

Gentile R S et al: "A Comparison of Techniques for Color Gamut Mismatch Compensation" Journal of Imaging Technology, Soc. for Imaging Science and Technology, Springfield, VA, US, vol. 16, No. 5, Oct. 1, 1990, pp. 176-181, XP000167934.

C. Tomasi, et al; Bilateral Filtering for Gray and Color Images, Proceedings of the 1998 IEEE International Conference on Computer Vision, pp. 839-846, 1998.

Wyszecki G. et al; Color Science Concepts and Methods, Quantitative Data and Formulae, 2nd edition John Wiley & Sons, Inc. New York 1982, pp. 129-130.

* cited by examiner

IMAGE GAMUT MAPPING

FIELD OF THE INVENTION

The invention relates to a method of gamut mapping of an input image composed of pixels and having an input gamut defined by input RGB primaries to a reproduction gamut defined by reproduction RGB primaries, wherein the reproduction gamut is narrower than the input gamut. The invention further relates to a device for gamut mapping of an input image, a video signal receiver comprising the device for gamut mapping, a camera comprising the device for gamut mapping, and a computer program product comprising code enabling a processor to execute the steps of the method of gamut mapping.

BACKGROUND OF THE INVENTION

Video signals are commonly defined in terms of a fixed set of primaries, such as those defined by the European Broadcast Union (EBU). In practice, however, the reproduction gamut may differ from that of the input signal, such that gamut-mapping algorithms are required to establish the optimal drive values for display of the video signals. This problem occurs frequently for mobile displays, which typically have a gamut that is substantially narrower than that of the EBU-standard.

The most straightforward approach to gamut mapping uses the RGB-drive values of the input directly as drive values for the primaries of the reproduction gamut without any color processing. However, in practice this may result in highly de-saturated images.

To better maintain the image colors, true-color mapping is applied to the input signal followed by a clipping operation to map the out-of-gamut colors to the required range (of [0, 255] for a non-normalized eight bit representation, or [0, 1] for a normalized representation). Because image colors positioned within the reproduction gamut are preserved, the overall colorfulness of the image is higher than that obtained by ignoring the color processing altogether. True-color mapping is for example disclosed in Wyszecki, G. and Stiles, W. S., "color science: concepts and methods, quantitative data and formulae ($2^{nd}$ edition), John Wiley & Sons, Inc., New York 1982.

Unfortunately, clipping results in highly annoying loss of detail. Moreover, when applied to individual RGB-channels, clipping may introduce hue errors, for which the human eye is very sensitive. The occurrence of hue errors can be partly prevented by dividing out-of-gamut colors by the maximum drive value of the RGB sub-pixels (which is also referred to as clipping-to-black or mapping to black). Although this approach works satisfactorily for images with only a few out-of-gamut pixels, it still causes a loss of detail when large areas of the image are located outside of the reproduction gamut. To prevent the occurrence of clipping artifacts, the gamut-mapping algorithm can be combined with an overall brightness reduction (soft clipping) as well as a saturation-dependent brightness correction.

SUMMARY OF THE INVENTION

It is an object of the invention to provide a gamut mapping which preserves the colors within the reproduction gamut but causes less loss of detail. A first aspect of the invention provides a method of gamut mapping of an input image as claimed in claim 1. A second aspect of the invention provides a device for gamut mapping as claimed in claim 10. A third aspect of the invention provides a video signal receiver as claimed in claim 11. A fourth aspect of the invention provides a camera as claimed in claim 12. A fifth aspect of the invention provides a computer program product as claimed in claim 13. Advantageous embodiments are defined in the dependent claims.

A method of gamut mapping in accordance with the first aspect of the invention receives an input image composed of pixels. Usually, the pixels in the input image correspond to pixels of a reproduction device, such as a display device or a printer. The display device may actually be a matrix display having pixels, but may also be a CRT. The input image has an input gamut defined by input RGB (red, green and blue) primaries. The reproduction device has a reproduction gamut defined by reproduction RGB primaries. The reproduction gamut is narrower than the input gamut, or said differently, the input gamut embraces the reproduction gamut.

The method transforms the input signal which represents the input image and which is defined with respect to the input RGB primaries into a transformed input signal defined with respect to the reproduction RGB primaries. The transformation is performed such that the color information of pixels within the reproduction gamut is preserved. Such a transformation, which as such is known, is also referred to as a true-color mapping. The input signals may be RGB signals. As will become clear, the out-of-gamut pixels which may have values larger than 1 or smaller than 0 are not clipping is in the known true-color mapping algorithms.

A scaling factor is determined which indicates a distance between on the one hand pixels of the transformed signal which are outside the reproduction gamut and on the other hand an edge of the reproduction gamut. Because no action is required for pixels that are inside the reproduction gamut, the scaling factor associated with these pixels is set to 1. The scaling factors of all pixels are spatially low-pass filtered to obtain filtered factors. Alternatively, the low-pass filter may only be applied over out-of-gamut pixels and in-gamut pixels are not modified at all. But this would have the disadvantage that inside gamut pixels that have out-of-gamut neighbors will not be mapped inwards a little to maintain the correct relative color differences. Finally, the component values of the pixels are corrected in response to the filtered factors to obtain the reproduction component values which are the input component values scaled with the filtered factors.

In the prior art, all the pixel values are scaled separately with their own scaling factor. This causes neighboring input pixel values outside of the gamut to be scaled to almost the same output pixel values on an edge of the gamut. Thus all output values of these pixels are positioned on this edge very near to each other. In fact the original color differences are very much compressed which causes the loss of details in areas in which the input color is outside the reproduction gamut. In accordance with the present invention, in these areas, the low-pass filtering of the scaling factors provides scaling factors which per pixel depend on the scaling factors in the local neighborhood of this pixel. Thus, this group of neighboring pixel values is scaled with scaling factors which differ less than in the prior art and consequently, the relative color differences of the pixels of the group are kept intact better, which results in a better preservation of the details in the image.

It has to be noted that U.S. Pat. No. 5,450,216 discloses a color image gamut mapping system from device-independent form to device-dependent form in a Cartesian color space. Digital images are mapped to any device-dependent gamut in a manner that minimizes the human visual response both to the luminance and the chrominance changes necessary to force out-of-gamut pixels into the specified device-dependent gamut. A neighborhood gamut mapping technique considers the subjective visual effect of nearby pixels on the mapping of each pixel. Image luminance is biased toward the luminance in the device-dependent gamut at which the greatest chroma magnitude is available for a fixed hue angle. Spatial filtering exploits the differing spatial frequency regions of insensitive human visual response to both luminance and chrominance changes.

This prior art does not disclose a color image gamut mapping from an input image defined by input RGB primaries to reproduction RGB primaries. The prior art color image gamut mapping is defined in the luminance/chrominance color space instead of the RGB space. This has the drawback that a look up table is required to determine whether an input pixel is within or outside the reproduction gamut. FIG. 6 of this prior art discloses that the low-pass filtered out-of-gamut distance is used to control the weights of a weighted average filter which determines the weighted average of the luminance of the input pixel and the looked-up luminance for the greatest chroma magnitude which is available for a fixed hue angle. The weights of this filter are controlled by the low-pass filtered out-of-gamut distances. In accordance with the present invention, the low-pass-filtered out-of-gamut distances control the scaling factor of the component signals. Further, it has to be noted that this prior art also changes the color of pixels inside the reproduction gamut and thus is not a true-color mapping.

In an embodiment, the spatial low-pass filtering comprises edge preserving low-pass filtering. This has the advantage that halo artifacts, which appear as bright or dark shadows around object edges, are prevented. Thus, a local content-adaptive gamut-mapping algorithm is obtained which optimally preserves the image colorfulness while preventing the occurrence of clipping and halo artifacts.

In an embodiment, the edge preserving low-pass filtering is bilateral filtering which comprises a spatial filter kernel and a weighting function. It has to be noted that the weighting function weights color differences between the to be filtered pixel and the pixels within the filter support of the filter kernel. The weighting function decreases with increasing color difference by assigning higher weight factors to pixels in the filter support which have a color value near to the to be filtered pixel than to pixels in the filter support which have a color value less near to the to be filtered pixel. In literature, the filter support is also referred to as the filter footprint. Such a bilateral filter as such is known from the publication: C. Tomasi and R. Manduchi, "Bilateral filtering for gray and color images", in Proceedings, IEEE international Conference on Computer Vision, pp. 839-846, 1998. This publication discloses a spatial filter kernel and a weighting function over the intensity differences between the current pixel and the pixels in the filter support. However, it has to be noted that in the present invention the weighting function is defined over color differences instead over intensity differences.

In an embodiment, the weight factors have a value one for pixels in the filter support which have a color difference with the to be filtered pixel below a predefined threshold. The weight factors have a value zero for pixels in the filter support which have a color difference above the predefined threshold. This relatively simple approach appeared to provide a very good performance of the approach.

In an embodiment, the transforming is defined by $RGBt=inv(A2)*A1*RGBin$. Both the input signal RGBin and the transformed signal RGBt are RGB signals. A1 and A2 are 3×3 matrices having columns containing tri-stimulus values (also referred to as components) of the input RGB primaries and the reproduction RGB primaries, respectively.

In an embodiment, for pixels of the transformed signal outside the reproduction gamut the scaling factors are determined as:

$$SFi=\min[(1-XR)/(RCi-XR), (1-XG)/(GCi-XG), (1-XB)/(BCi-XB)]$$

if at least one of the component values of the pixel is larger than 1, $$SFi=\min[(0-XR)/(1-RCi-XR), (0-XG)/(1-GCi-XG), (0-XB)/(1-BCi-XB)].$$

if at least one of the component values of the pixel is smaller than 0.

Wherein SFi is the scaling factor, RCi, GCi, BCi are normalized RGB component values of a pixel of the transformed signal RGBt, and XR, XG, XB are normalized RGB component values of a color point in the reproduction gamut to which the transformed signal RGBt is scaled. The scaling factors for the pixels inside the reproduction gamut are set to 1.

The normalized RGB component values of the color point in the reproduction gamut to which the transformed signal is scaled may be selected anywhere within the reproduction gamut. For example, to optimally preserve the color information, on a gray line connecting a white color point with a black color point. For example, the normalized RGB component values of the color point in the reproduction gamut to which the transformed signal is scaled is selected to be the white color point if RCi or GCi or BCi is smaller than zero or the black color point if RCi or GCi or BCi is larger than one. In the black color point the normalized RGB component values of color point in the reproduction gamut to which the transformed signal is scaled are all three zero.

In an embodiment, the correcting comprises a global gain factor for controlling a strength of the correcting. This global gain factor, which at least is identical for the correction factors of same objects, influences the scaling factors all at the same manner. For example, the low-passed scaling factors are multiplied with the global gain factor or the low-passed scaling factors are corrected by generating low-passed scaling factors to the power of the global gain factor. The control of the global gain factor may be used to change the amount of mapping of the out-of-gamut pixel into the reproduction gamut. The global gain factor may be automatically determined to ensure that all out-of-gamut pixels are moved into the reproduction gamut. The global gain factor may also be user defined or controlled. It has to be noted that due to the averaging of the scaling factors, for particular pixels outside the reproduction gamut, the mapping towards the reproduction gamut, does not move all these pixels to the inside or to an edge of the gamut. By selecting the appropriate global gain factor it is possible to also move these pixels to the inside or to an edge of the reproduction gamut.

These and other aspects of the invention are apparent from and will be elucidated with reference to the embodiments described hereinafter.

It should be noted that items which have the same reference numbers in different Figures, have the same structural features and the same functions, or are the same signals. Where the function and/or structure of such an item has been explained, there is no necessity for repeated explanation thereof in the detailed description. It has further to be noted that when a capital letter or o combination of capital letters is followed by a small letter i, this i is considered to be a general index. The i indicates that of the item indicated by the preceding capital letter(s) exist more than one. A particular one of these items will be indicated by using a number instead of the i. Thus, Pi refers to any pixel described or shown in a Figure, while P1 is the pixel indicated in the Figure(s) by P1.

DETAILED DESCRIPTION

Figure 1:
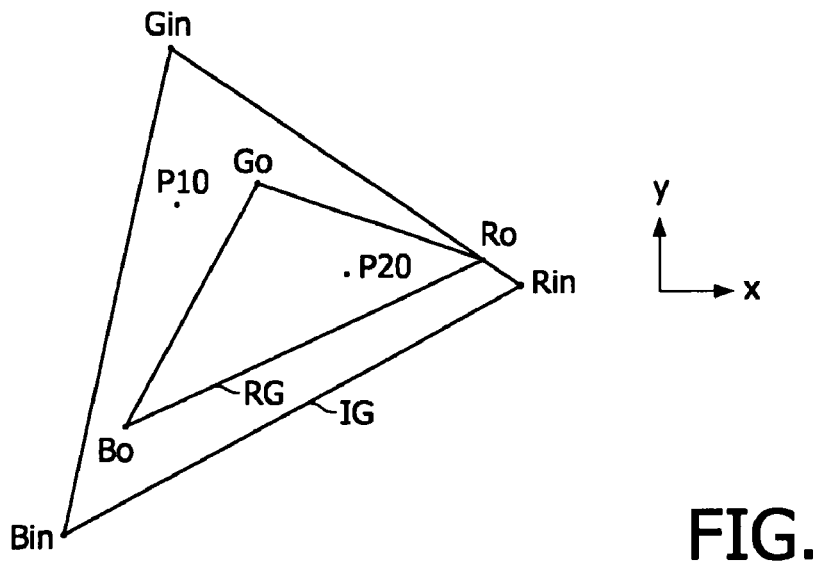
FIG. 1 shows an example of an input gamut and an output gamut and their RGB primaries in a CIE xy chromaticity diagram.

FIG. 1 shows an example of an input gamut and an output gamut and their RGB primaries in a CIE xy chromaticity diagram. The input gamut IG is defined by the input primaries Rin, Gin, Bin which form the vertices of the input gamut triangle. The reproduction gamut RG is defined by the reproduction RGB primaries Ro, Go, Bo which form the vertices of the reproduction gamut triangle. The input gamut triangle embraces the reproduction gamut triangle. By way of example, two input pixels P10 and P20 are shown. The input pixel P20 already lies within the reproduction gamut RG and thus need not be corrected. The input pixel P10 lies outside the reproduction gamut RG and thus cannot be faithfully reproduced. The present invention is related to how such an input pixel P10 which lies outside the reproduction gamut RG has to be scaled into the reproduction gamut RG with minimal loss of details.

Figure 2:
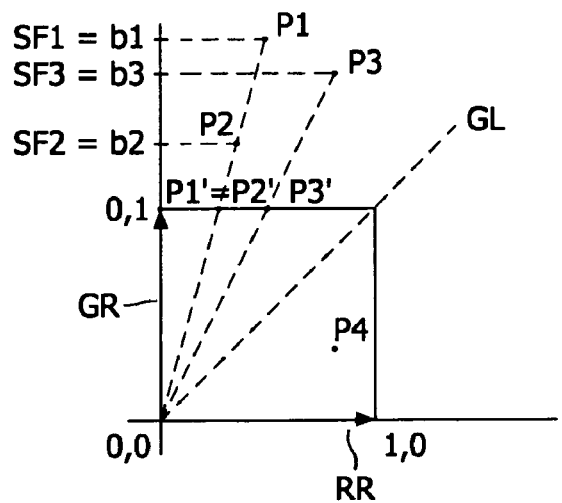
FIG. 2 shows an example of a prior art gamut mapping of input pixels in a reproduction RG sub-space.

FIG. 2 shows an example of a prior art gamut mapping of input pixels in a reproduction RG sub-space. This figure only shows the two-dimensional RG sub-space of the three-dimensional RGB space to simplify the elucidation of what happens in the three-dimensional RGB space. The red vector RR and the green vector GR, which represent the red and green reproduction primaries, form an orthogonal coordinate system. The third dimension defined by the blue vector is not shown. The length of the red vector RR defines the value of the red component of a pixel and the length of the green vector GR defines the value of the green component of a pixel. The contributions of red and green are normalized to the interval [0, 1] which makes the representation independent on the actual implementation. In a practical implementation it is not possible to supply negative contributions or contributions larger than one. Thus the reproduction gamut in the RG space of FIG. 2 is limited to the square defined by the red vector RR and the green vector RG. In the point 0,0, both the red vector RR and the green vector GR have a length zero. If also the blue vector is zero, this point is reproduced as black. In the point 1,1, both the red vector RR and the green vector GR have a length one. If also the blue vector is one, this point is reproduced as white. Consequently, the grey levels are located on the line GL through the black point and the white point.

The pixel P4 has a color inside the reproduction gamut RG and thus is faithfully displayed without any correction. The pixels P1, P2, P3 are positioned outside the reproduction gamut RG because in the example shown the green contribution is larger than one. The colors of these pixels should be corrected to be able to reproduce them with the reproduction primaries Ro, Go of the red/green portion of the reproduction gamut RG.

The prior art clip-to-black true-color mapping shown in FIG. 2 indeed does not correct the color of the pixel P4, and shifts the pixels P1 to P3 along a line connecting these pixels with black (thus the point 0,0) until the green component has the length 1. For each one of the pixels P1 to P3 outside of the gamut, this process may be defined as first searching for the largest value of the components along the vectors GR and RR. In this example the components along the vector GR have the largest value b1, b2, b3 for the pixels P1, P2, P3, respectively. The corrected pixel P1' is determined by dividing both the components along the vectors GR and RR of the pixel P1 by the value b1, corrected pixel P2' is determined by dividing both the components along the vectors GR and RR of the pixel P2 by the value b2, and corrected pixel P3' is determined by dividing both the components along the vectors GR and RR of the pixel P3 by the value b3. Therefore, the values 1/b1, 1/b2, 1/b3 are also referred to as scaling factors SF1, SF2, SF3. These scaling factors SF1, SF2 are multiplied with the component values of the input pixels P1, P2, P3, respectively, to obtain the corrected pixels P1', P2', P3'.

The corrected pixels P1' to P3' now have colors which are nearest to the original colors. However, the difference in colors between the reproduced colors of the corrected pixels P1' to P3' is much smaller than the difference in colors between the original colors of the pixels P1 to P3. Consequently, the prior art approach has the drawback that the details (small differences in color) are lost due to the gamut mapping from outside the reproduction gamut RG into this gamut.

Figure 3:
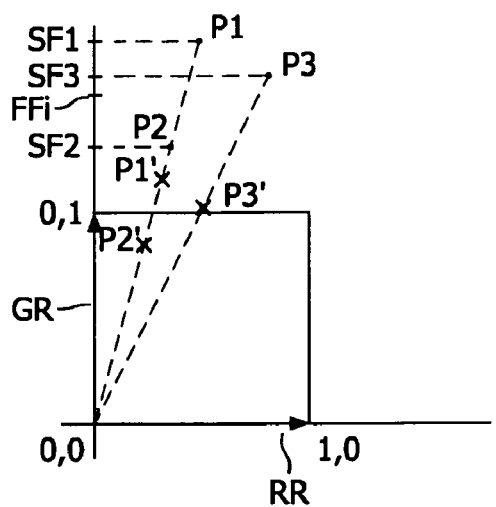
FIG. 3 shows an embodiment in accordance with the present invention of a gamut mapping of input pixels in a reproduction RG sub-space.

FIG. 3 shows an embodiment in accordance with the present invention of a gamut mapping of input pixels in a reproduction RG sub-space. FIG. 3 shows the same RG space as FIG. 2 with the same pixels P1 to P4 and is also a clip-to-black true-color mapping. The difference with FIG. 2 is that now a spatial low-pass filtering 3 (see FIG. 5) is applied on the scaling factors SF1, SF2, SF3 of the pixels P1 to P3 which are neighboring in the sense that they all are within the support of the filter 3. The spatial low-pass filter 3 weights the scaling factors SF1=1/b1, SF2=1/b2 and SF3=1/b3 according to a weighting function to obtain a filtered scaling factor FF1, FF2, FF3 for each of the pixels P1 to P3. Due to the low-pass character of the filter 3 these scaling factors FF1, FF2, FF3 of neighboring pixels will be more equal than the original scaling factors SF1, SF2, SF3. Consequently, the component values of each the input pixels P1, P2, P3 are now scaled with the more equal filtered scaling factor FF1, FF2, FF3, and the differences between the pixels P1 to P3 are preserved much better than in the prior art approach discussed with respect to FIG. 2.

As is shown in FIG. 3, due to the low-pass filtering, at least some of the filtered scaling factors FF1, FF2, FF3 are too small to map the corresponding one of the pixels P1 to P3 into the reproduction gamut RG. Consequently, these scaled pixels P1' and P3' still cannot be reproduced. A global gain factor may be introduced which is identical for all input pixels P1 to P3 such that all the input pixels are mapped into the reproduction gamut RG. This global gain factor may be user controlled.

Figure 4:
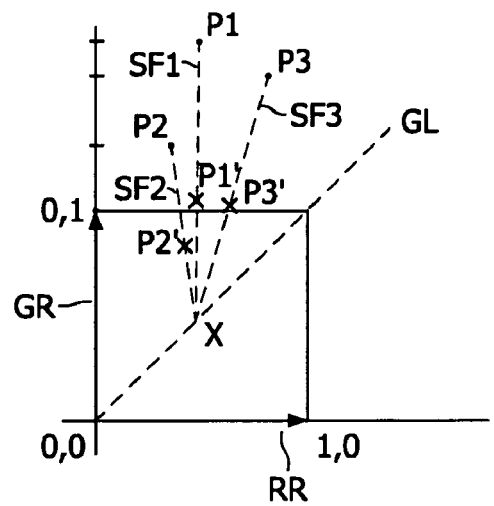
FIG. 4 shows another embodiment in accordance with the present invention of a gamut mapping of input pixels in a reproduction RG sub-space.

FIG. 4 shows another embodiment in accordance with the present invention of a gamut mapping of input pixels in a reproduction RG sub-space. FIG. 4 shows the same RG subspace as FIG. 3 with the same pixels P1 to P4 but now with a clip-to-grey true-color mapping. The grey point to which is clipped is indicated by X. This approach is almost identical to the approach described with respect to FIG. 3. The only difference is that the scaling factors SFi are determined with respect to the grey point instead of the black point 0,0, and that the scaling is performed towards the grey point X instead of the black point 0,0.

More in general, the scaling may be performed towards any color point within the reproduction gamut RG.

Figure 5:
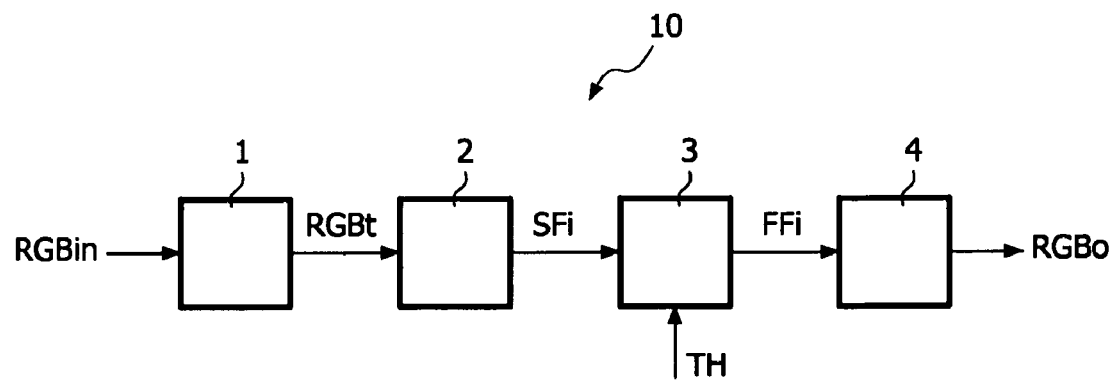
FIG. 5 shows a block diagram of a gamut mapping device performing a gamut mapping in accordance with an embodiment of the invention.

FIG. 5 shows a block diagram of a gamut mapping device performing a gamut mapping in accordance with an embodiment of the invention. The gamut mapping device 10 comprises a color transforming unit 1, a scaling factor unit 2, a spatial low-pass filter 3, and a correction unit 4.

The color transforming unit 1 transforms the input signal RGBin defined with respect to the input RGB primaries Rin, Gin, Bin into the transformed signal RGBt defined with respect to the reproduction RGB primaries Ro, Go, Bo. The color transforming unit 1 preserves the color of input pixels which are within the reproduction gamut RG.

For example, if both the input signal RGBi and the transformed signal RGBt are RGB signals, the transforming action of the color transforming unit 1 is defined by:

$$RGBt = inv(A2) * A1 * RGBin$$

wherein RGBin is the input signal, RGBt is the transformed signal, A1 and A2 are 3×3 matrices having columns containing tri-stimulus values of the input RGB primaries Rin, Gin, Bin and the reproduction RGB primaries Ro, Go, Bo, respectively.

The scaling factor unit 2 determines the scaling factor SFi, at least for each one of the transformed pixels Pi which are outside the reproduction gamut RG. For example, for a pixel Pi with components Ri, Bi, Gi of which one or more values are larger than 1, and a mapping to a color point X defined by the coordinates XR, XG, XB, the scaling factor unit 2 calculates the scaling factors as:

$$SFi = min[(1-XR)/(RCi-XR), (1-XG)/(GCi-XG), (1-XB)/(BCi-XB)]$$

With min [ ] is meant the smallest fraction of the distance between 1 and the respective coordinates of the color point X and the distance between the corresponding component of the pixel Pi and the corresponding coordinate of the color point X.

By way of example, for mapping to black, which is usually a good approach for input pixels Pi outside the reproduction gamut RG which have at least one component larger than 1, the coordinates of the color point X are XR=XG=XB=0, the scaling factor unit 2 calculates the scaling factors as:

$$SFi = min(1/RCi, 1/GCi, 1/BCi) = (1/max(RCi, GCi, BCi)).$$

On the other hand, for a pixel Pi with components Ri, Bi, Gi of which one or more values are smaller than 0, and a mapping to a color point X defined by the coordinates XR, XG, XB, the scaling factor unit 2 calculates the scaling factors SFi as:

$$SFi = min[(0-XR)/(1-RCi-XR), (0-XG)/(1-GCi-XG), (0-XB)/(1-BCi-XB)]$$

For a mapping to white, which is usually a good approach for input pixels Pi outside the reproduction gamut RG which have at least one component smaller than 0, the coordinates of the color point X are XR=XG=XB=1, the scaling factor unit 2 calculates the scaling factors as:

$$SFi = min(-1/-RCi, -1/-GCi, -1/-BCi)$$

It has to be noted Page: 10 that these last two equations are identical. This is due to the fact that the general mapping equation differs for pixels larger than one and below zero and the base-point X is set accordingly.

The spatial low-pass filter 3 spatially low-pass filters the scaling factors SFi to obtain a filtered factor FFi for at least each one of the pixels Pi outside the reproduction gamut RG. The operation of this filter 3 is elucidated in more detail with respect to FIGS. 6A and 6B.

The correction unit 4 uses this filtered factor FFi to move the corresponding out-of-gamut input pixel Pi towards or into the reproduction gamut RG. For example, the correction unit performs the calculation:

$$RGBo = Xrgb + RGBin \cdot FFi^g.$$

Wherein RGBin represents the input component (usually RGB) values expressed in terms of the reproduction primaries Ro, Go, Bo, RGBo represents the output component (usually RGB) values of the reproduction primaries Ro, Go, Bo, Xrgb represent the color point towards which the mapping is conducted, the · defines a point-wise multiplication of these components, and the factor g is the global gain factor which may be user defined and which controls the strength of the correction applied by the correction unit 4.

It has to be noted that the correction unit 4 uses the low-pass filtered scaling factors FFi to map the input component RGBin towards the color point Xrgb which is selected inside the reproduction gamut RG. If the color point Xrgb is 0,0,0, this mapping is a real scaling.

Figure 6A:
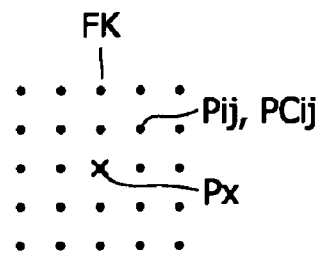
FIGS. 6A and 6B show the filter kernel and the filter weight function of the spatial low-pass filter.
Figure 6B:
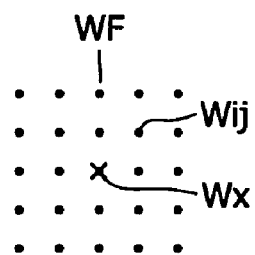

FIGS. 6A and 6B show the filter kernel and the filter weight function of the low-pass filter.

FIG. 6A shows an example of a spatial filter kernel FK which, by way of example, has a support or footprint of 5 by 5 pixels Pij with pixel component values collectively referred to as PCij. The to be filtered pixel is indicated by Px.

FIG. 6B shows schematically the weighting function WF which has weighting factors Wij, whereby the weighting factor Wx is the weighting factor for the to be filtered pixel Px. The weighting function WF weights color differences between the to be filtered pixel Px and the pixels Pij within the filter support of the filter kernel FK.

In an embodiment, the filter 3 performs an edge preserving low-pass filtering. An example of an edge-preserving filter is a bilateral filter of which the weighting function WF decreases with increasing color difference by assigning higher weight factors Wij to pixels Pij in the filter support which have a color value PCij more similar to the to be filtered pixel Px than to pixels Pij in the filter support having a color value PCij less similar to the to be filtered pixel Px.

In an embodiment, the weight factors Wij have a value 1 for pixels Pij in the filter support having a color difference with the to be filtered pixel Px below a predefined threshold TH and 0 for pixels Pij in the filter support having a color difference above the predefined threshold TH.

Figure 7:
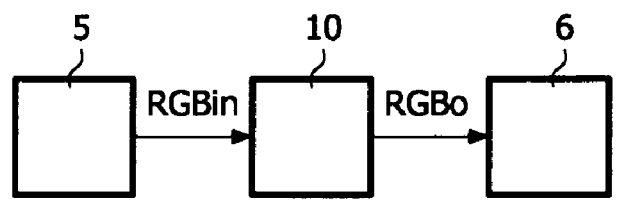
FIG. 7 shows a block diagram of an image signal receiver comprising the gamut mapping device.

FIG. 7 shows a block diagram of an image (still picture, such as e.g. a portable photo renderer, or video) signal receiver comprising the gamut mapping device (an example is a device with television capabilities, such as a television set). The image signal receiver comprises an input processing unit for processing a video input signal to supply the input signal RGBin to the gamut mapping device 10. The gamut mapping device 10 supplies the reproduction signal RGBo to the display device 6.

Figure 8:
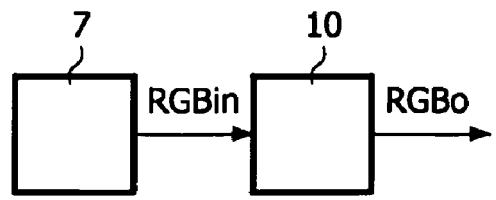
FIG. 8 shows a block diagram of a camera comprising the gamut mapping device.

FIG. 8 shows a block diagram of a camera comprising the gamut mapping device. The camera comprises an image capturing sensor (7) for supplying the input image as the input signal RGBin to the gamut mapping device 10 which supplies the reproduction signal RGBo.

The gamut mapping procedure in accordance with the present invention is applicable to any situation wherein the reproduction gamut RG is smaller than the gamut of the input image. This is especially true for many mobile displays. With the advent of wide-gamut acquisition equipment it is expected that such a gamut mapping will become necessary to display wide-gamut input video on EBU displays which inherently have a smaller reproduction gamut. Also in applications in which the input signal, for example the EBU signal, has to be extended to make use of the large gamut of a wide-gamut display out-of-gamut colors may be generated which can brought back into the reproduction gamut in accordance with the approach of the present invention. Finally, the gamut mapping procedure in accordance with the present invention can be applied in any scenario wherein clipping artifacts need to be prevented such as in combination with algorithms aimed at sharpness and contrast enhancement. These methods often involve an amplification of the middle and high frequencies, which may result in drive values than are larger than the allowed range. The approach in accordance with the present invention largely decreases the loss of detail due to clipping.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of gamut mapping of an input image composed of pixels and having an input gamut (IG) defined by input RGB primaries ($R_i$, $G_i$, $B_i$) to a reproduction gamut (RG) defined by reproduction RGB primaries ($R_O$, $G_O$, $B_O$), wherein the reproduction gamut (RG) is narrower than the input gamut (IG), the method comprises:
color transforming an input signal ($RGB_{in}$) defined with respect to the input RGB primaries ($R_i$, $G_i$, $B_i$) into a transformed signal ($RGB_t$) defined with respect to the reproduction RGB primaries ($R_O$, $G_O$, $B_O$), whereby color information of the pixels (P1, P2, P3) within the reproduction gamut (RG) is preserved,
determining scaling factors ($SF_i$) indicating a distance between on the one hand pixels (P1, P2, P3) of the transformed signal ($RGB_t$) which are outside the reproduction gamut (RG), and on the other hand an edge of the reproduction gamut (RG),
spatial low-pass filtering of the scaling factors ($SF_i$) of pixels (P1, P2, P3) of the transformed signal ($RGB_t$) to obtain filtered factors ($FF_i$) for these pixels (PI, P2, P3), and
correcting component signal values of the transformed signal ($RGB_t$) in response to the filtered factors ($FF_i$) to obtain reproduction signal values ($RGB_O$) being input values ($RGB_{in}$) moved towards inside the reproduction gamut (RG).

2. A method as claimed in claim 1, wherein the spatial low-pass filtering comprises edge preserving low-pass filtering.

3. A method as claimed in claim 2, wherein the edge preserving low-pass filtering is a bilateral filtering comprising:
a spatial filter kernel (FK), and
a weighting function (WF) over color differences between the to be filtered pixel ($P_x$) and the pixels ($P_{ij}$) within the filter support of the filter kernel (FK), wherein the weighting function (WF) decreases with increasing color difference by assigning higher weight factors ($W_{ij}$) to pixels ($P_{ij}$) in the filter support having a color value more similar to the to be filtered pixel ($P_x$) than to pixels ($P_{ij}$) in the filter support having a color value less similar to the to be filtered pixel ($P_x$).

4. A method as claimed in claim 3, wherein the weight factors ($W_{ij}$) have a value one for pixels ($P_{ij}$) in the filter support having a color difference with the to be filtered pixel ($P_x$) below a predefined threshold (TH) and zero for pixels ($P_{ij}$) in the filter support having a color difference above the predefined threshold (TH).

5. A method as claimed in claim 1, wherein the transforming is defined by $RGB_t = \text{inv}(A2) * A1 * RGB_i$, wherein $RGB_i$, is the input signal being an RGB signal, $RGB_t$ is the transformed signal being an RGB signal, A1 and A2 are 3×3 matrices having columns containing tri-stimulus values of the input RGB primaries ($R_i$, $G_i$, $B_i$) and reproduction RGB primaries ($R_O$, $G_O$, $B_O$), respectively.

6. A method as claimed in claim 1, wherein the determining scaling factors ($SF_i$) determines the scaling factors ($SF_i$) for pixels (P1, P2, P3) of the transformed signal ($RGB_t$) outside the reproduction gamut (RG) as:
$SF_i = \min[(1-XR)/(RC_i-XR), \quad (1-XG)/(GC_i-XG), (1-XB)/(BC_i-XB)]$ if at least one of the component values of the pixel is larger than 1, or
$SF_i = \min[(0-XR)/(1-RC_i-XR), \quad (0-XG)/(1-GC_i-XG), (0-XB)/(1-BC_i-XB)]$
if at least one of the component values of the pixel is smaller than 0,
wherein $SF_i$ is the scaling factor, $RC_i$, $GC_i$, $BC_i$ are normalized RGB component values of a pixel (P1, P2, P3) of the transformed signal ($RGB_t$), and XR, XG, XB are normalized RGB component values of a color point in the reproduction gamut (RG) to which the transformed signal ($RGB_t$) is scaled.

7. A method as claimed in claim 6, wherein the normalized RGB component values of the color point in the reproduction gamut (RG) to which the transformed signal ($RGB_t$) is scaled is selected on a gray line connecting a white color point with a black color point.

8. A method as claimed in claim 7, wherein the normalized RGB component values of the color point in the reproduction gamut (RG) to which the transformed signal ($RGB_t$) is scaled is selected to be the white color point if RCi or GCi or BCi is smaller than zero or the black color point if RCi or GCi or BCi is larger than one.

9. A method as claimed in claim 1, wherein the correcting calculates the reproduction signal values ($RGB_O$) as:

$$RGB_O = Xrgb + RGB_{in} \cdot FFi^g,$$

wherein $RGB_{in}$ represents input component values of the input signal ($RGB_{in}$) expressed in terms of the reproduction primaries ($R_O$, $G_O$, $B_O$), $RGB_O$ represents the reproduction component values of the reproduction signal ($RGB_O$) in terms of the reproduction primaries ($R_O$, $G_O$, $B_O$), Xrgb represent a color point (X) inside the reproduction gamut (RG) towards which the mapping is conducted, the · defines a point-wise multiplication of the $RGB_{in}$ input component values and the filtered factors (FFi), and the factor g is a global gain factor (g) controlling an amount of the correcting.

10. A method as claimed in claim 1, wherein the correcting comprises a global gain factor for controlling a strength of the correcting.

11. A device for gamut mapping of an input image composed of pixels (P1, P2, P3) and having an input gamut (IG) defined by input RGB primaries ($R_i$, $G_i$, $B_i$) to a reproduction gamut (RG) defined by reproduction RGB primaries ($R_O$, $G_O$, $B_O$), wherein the reproduction gamut (RG) is narrower than the input gamut (IG), the device comprises:

a color transforming unit for transforming an input signal ($RGB_{in}$) defined with respect to the input RGB primaries ($R_i$, $G_i$, $B_i$) into a transformed signal ($RGB_t$) defined with respect to the reproduction RGB primaries ($R_O$, $G_O$, $B_O$), such that color information of the pixels (P1, P2, P3) within the reproduction gamut (RG) is preserved, a scaling factor unit for determining scaling factors ($SF_i$) indicating a distance between on the one hand pixels (P1, P2, P3) of the transformed signal ($RGB_t$) which are outside the reproduction gamut (RG), and on the other hand an edge of the reproduction gamut (RG), a spatial low-pass filter for filtering of the scaling factors ($SF_i$) of pixels (P1, P2, P3) of the transformed signal ($RGB_t$) to obtain filtered factors (FFi) for these pixels (P1, P2, P3), and a correction unit for correcting component signal values of the transformed signal ($RGB_t$) of the pixels (P1, P2, P3) in response to the filtered factors (FFi) to obtain reproduction signal values ($RGB_O$) being input values ($RGB_i$) moved towards inside the reproduction gamut (RG).

12. An image signal receiver comprising the device for gamut mapping as claimed in claim 11, and comprising a display device for displaying the reproduction signal values ($RGB_O$).

13. A camera comprising the device for gamut mapping as claimed in claim 11, and an image capturing sensor for supplying the input image.

14. A computer program product comprising non-transitory computer-readable medium storing code enabling a processor to execute the steps of the method as claimed in claim 1, the steps being:

transforming an input signal ($RGB_{in}$) defined with respect to the input RGB primaries ($R_i$, $G_i$, $B_i$) into a transformed signal ($RGB_t$) defined with respect to the reproduction RGB primaries ($R_O$, $G_O$, $B_O$), such that color information of the pixels (PI, P2, P3) within the reproduction gamut (RG) is preserved, determining scaling factors (SFi) indicating a distance between on the one hand pixels (PI, P2, P3) of the transformed signal ($RGB_t$) which are outside the reproduction gamut (RG), and on the other hand an edge of the reproduction gamut (RG), spatial low-pass filtering of the scaling factors (SFi) of pixels (P1, P2, P3) of the transformed signal ($RGB_t$) to obtain filtered factors (FFi) for these pixels (P1, P2, P3), and correcting component signal values of the transformed signal ($RGB_t$) of the pixels (P1, P2, P3) in response to the filtered factors (FFi) to obtain reproduction signal values ($RGB_O$) being input values ($RGB_i$) moved towards inside the reproduction gamut (RG).

* * * * *